United States Patent [19]
Marovich

[11] 4,068,421
[45] Jan. 17, 1978

[54] FRAMELESS SHELTER FOR SUNLIT ENCLOSURES SUCH AS GREENHOUSES, SOLARIUMS AND POOL SHELTERS

[76] Inventor: John M. Marovich, 1564 Welling, Troy, Mich. 48084

[21] Appl. No.: 728,613

[22] Filed: Oct. 1, 1976

[51] Int. Cl.² ............................................. E04B 1/32
[52] U.S. Cl. .......................................... 52/80; 52/86; 47/17; 47/18
[58] Field of Search .................. 52/80, 81, 86, 63, 82; 47/17, 18

[56] References Cited

U.S. PATENT DOCUMENTS

| | | | |
|---|---|---|---|
| 446,028 | 2/1891 | Smith | 52/80 |
| 2,092,722 | 9/1937 | Bangert | 52/81 |
| 2,176,712 | 10/1939 | Hanson | 52/81 |
| 3,187,852 | 6/1965 | Carman | 52/86 |
| 3,550,335 | 12/1970 | Huffman | 52/82 |
| 3,676,880 | 7/1972 | Kwake | 52/2 |
| 3,747,131 | 7/1973 | Koliomichalis | 52/2 |
| 3,916,578 | 11/1975 | Forootan | 52/80 |

FOREIGN PATENT DOCUMENTS

| | | | |
|---|---|---|---|
| 774,802 | 1/1968 | Canada | 52/81 |
| 378,336 | 10/1907 | France | 47/17 |
| 517,548 | 8/1940 | United Kingdom | 52/80 |

OTHER PUBLICATIONS

Dome Book 2 © 1971, p. 15.
Webster's Seventh New Collegiate Dictionary © 1961, p. 259.

Primary Examiner—Ernest R. Purser
Assistant Examiner—Henry Raduazo
Attorney, Agent, or Firm—Krass & Young

[57] ABSTRACT

A frameless shelter is disclosed constructed of a plurality of spherically shaped panel sections having the same radius of curvature and fabricated from a sunlight transmitting plastic adapted to be assembled together to form a dome structure. The panel sections are formed with U-shaped channel edges adapted to nest together with the contiguous edges of adjacent panels so as to provide vertically extending stiffener ribs so that a separate frame is not required, and at the same time act as locating means for the panels so that the dome may be readily assembled. The edges of the lowermost tier of panels rest in a channel support extending about the periphery thereof and resting on footings at ground level or on a wall structure extending above the ground. A center pole reinforcement is also included which also provides an electrical conduit for an electrically operated exhaust fan which may be included. An access door is formed by a spherically shaped door panel mounted within a frame lining a complementarily shaped opening in one of the lower tier panel sections, with the door being disclosed as of two piece or "dutch door" construction to allow ventilation by opening of the top half. Variations disclosed are a half dome construction adapted for installations against existing buildings and an elongated or extended version in which half dome sections are connected with a semi-cylindrical middle section. Also disclosed is a floating pool shelter in which the dome structure is mounted on a flotation ring providing sufficient buoyancy to support the dome so as to allow the dome to be floated on a pool surface.

11 Claims, 10 Drawing Figures

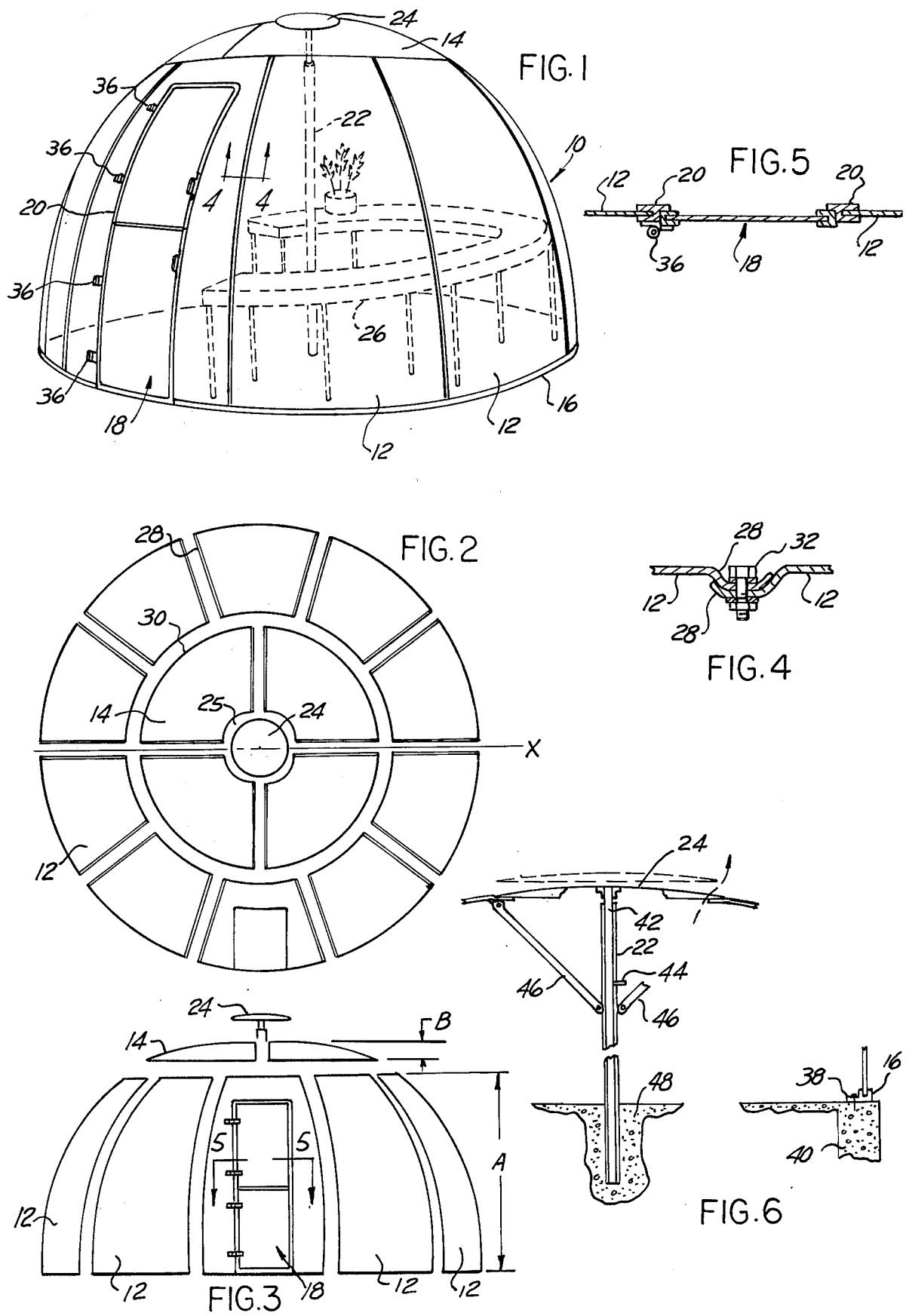

FRAMELESS SHELTER FOR SUNLIT ENCLOSURES SUCH AS GREENHOUSES, SOLARIUMS AND POOL SHELTERS

BACKGROUND OF THE INVENTION

1. Field of the Invention

This invention concerns shelter structures and more particularly shelter structures particularly adapted to provide sunlit enclosures such as greenhouses, solariums, or pool shelters.

2. Brief Description of the Prior Art

Greenhouse construction has typically involved a frame of wood or metal with individual flat or curved panes of glass being fit within the frame to provide the enclosure. Formerly, such frames were constructed of a rot resistant wood such as cypress or redwood since the high humidity environment of greenhouses is highly conducive to rot, and the wood framing is constantly wet by condensate run-off from the glass panes. The high maintenance requirements of wood structures is such that in recent years, greenhouse constructions particularly for non-commercial or residential installation, has been of aluminum frame. However, this construction also has considerable disadvantage in that the assembly is quite time-consuming and painstaking since the frame is made up of a large number of individual parts which must be fastened together. Furthermore, the metal frame members form a conductive heat flow path from the interior of the enclosure to the exterior creating a heat loss which can be quite considerable, and air leakage at the glass pane-frame joints can contribute to further heat loss. In recent years the energy shortage has made the heat loss problem more acute.

Additionally, the aluminum frame and glass construction produces considerable condensate due to chilling of the metal and glass by low ambient temperatures, which necessitates condensate gutters, etc. The surface area occupied by the opaque frame also reduces the light available in the enclosure by the shadowing created thereby, which is of some significance since it is highly desirable to maximize available light during the winter months for many plants commonly grown in greenhouses.

Furthermore, the aesthetic impression of an aluminum framed structure is objectionable to many, particularly when the aluminum finish is unenameled or anodized as is commonly the case.

The framed construction also tends to limit the exterior lines of the greenhouse to a very few traditional gabled roof constructions or polygonal structures in which flat panes are installed in a framework comprised of a multi-sided polygonal figure. While curved glass and plastic structures have previously been utilized, these have been comprised of simply rolled surfaces to provide semi-cylindrical exterior shapes, which are reminiscent of quonset huts.

These limitations are rather significant in the context of the do-it-yourselfer and the homeowner who wishes to install such structures appurtenant to his home or grounds, i.e. the aesthetical considerations become very important as does the relative ease of assembly. These problems have likewise curtailed the use of sunlit enclosures other than those intended for use as greenhouses such as solariums, pool shelters, etc.

The assembly problem described above has also existed in other structures in which aluminum frames and panels are utilized to provide utility or storage shelters.

Previous attempts such as that disclosed in U.S. Pat. No. 3,221,451 issued to Stolz have attempted to alleviate this problem but the need for reinforcement thereof in the absence of a frame has led to relatively complex panel configurations which are difficult to fabricate without excessive wastage and which are difficult to assemble due to the large number of parts which must be positioned carefully and secured together.

Pool shelters themselves have tended to be elaborate and complex structures supported on permanent frames about the pool periphery, which also tend to be of little aesthetic appeal and it would be highly desirable if a simple, relatively inexpensive structure could be provided which could be utilized as a pool shelter.

It is therefore an objection of the present invention to provide a frameless shelter particularly suited for sunlit enclosure which is relatively easy to assemble and reduces heat losses to a minimum while maximizing the light level within enclosure and at the same time having outstanding aesthetic qualities.

It is a further object of the present invention to provide a pool shelter which does not require a ground mounted frame.

SUMMARY OF THE INVENTION

These and other objects which will become apparent upon a reading of the following specification and claims is accomplished by interfitting together a plurality of curved spherically shaped panel sections formed of light transmitting material, with each panel section having a channel edge formed therein and adapted to nest within the contiguous edges of adjacent panel sections, the nested edges secured together to provide a domed enclosure. A variation of this structure is a half dome shelter provided by a plurality of such panels being assembled to form a half-dome which is suitable for installation appurtenant to a dwelling or other existing building. This frameless construction is also applicable to a pool shelter by providing a floating ring buoyant support for the hemispherically formed enclosure described above. The panel sections may be formed of metal or other opaque material to provide a frameless shelter for other applications.

DESCRIPTION OF THE DRAWINGS

FIG. 1 is a perspective view of a frameless shelter according to the present invention with its application to greenhouses;

FIG. 2 is an exploded elevational view of the greenhouse depicted in FIG. 1;

FIG. 3 is an exploded plan view showing the interfitting of the individual panel sections;

FIG. 4 is a sectional view of a typical joint and fastener arrangement by which the individual panel sections are secured together;

FIG. 5 is a sectional view showing the installation of the door and door frame;

FIG. 6 is a partially sectional view of the structure shown in FIGS 1-3 showing the installation of the bottom panel edges into support footings;

DETAILED DESCRIPTION

Figure 7:
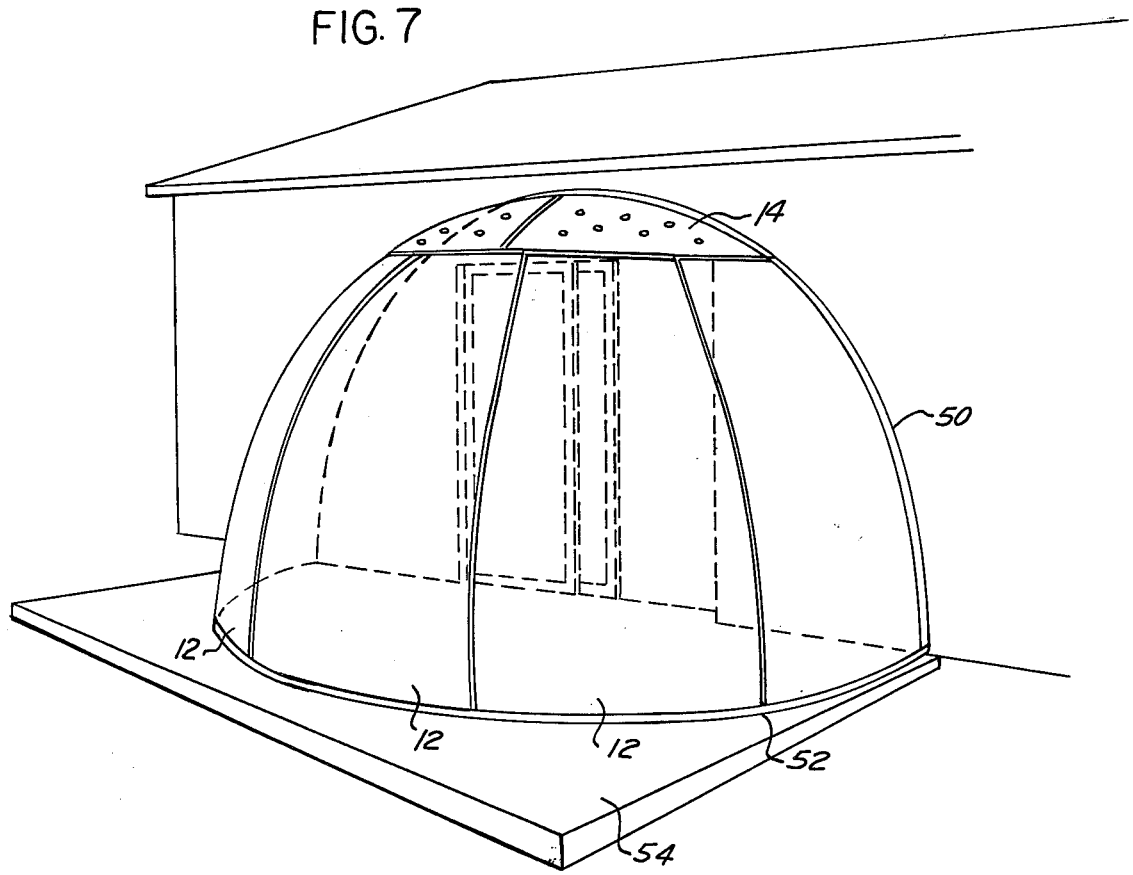
FIG. 7 is a perspective view of the half dome application of the frameless shelter according to the present invention shown installed against a house patio door on the patio slab.
Figure 8:
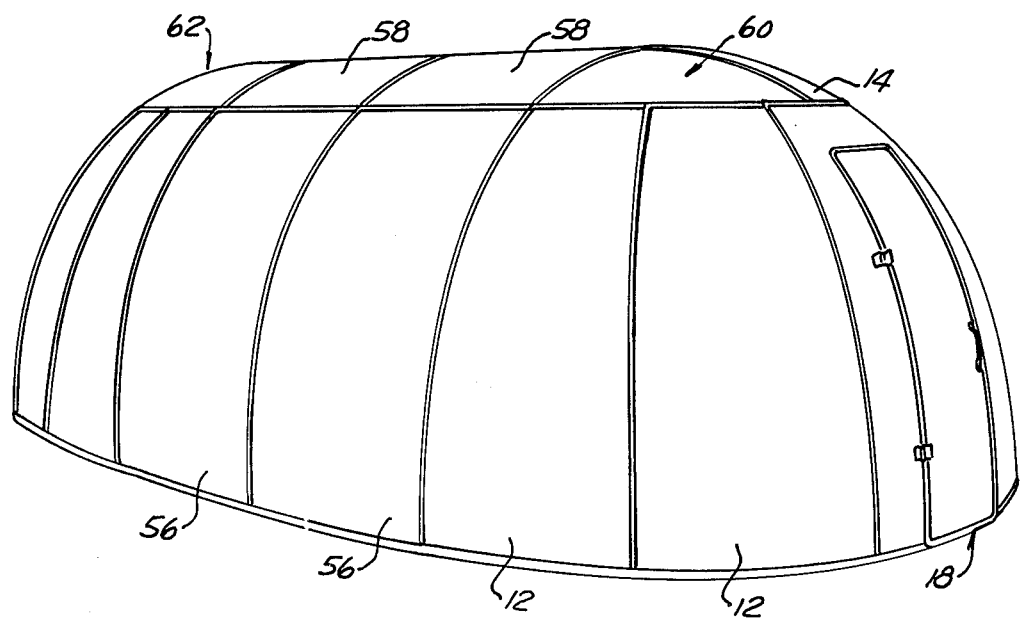
FIG. 8 is a perspective view of an extended model in which the generally hemispherical shape is extended by the addition of a generally semi-cylindrical section between half-sections of said hemisphere.

In the following specification certain specific terminology will be utilized and particular embodiments described for the sake of clarity in accordance with requirements of 35 USC 112 but it is to be understood that the inventive concept is susceptible of a great number of manifestations and the same is not to be construed as intended to be limiting.

Referring to FIGS. 1-3, the frameless shelter according to this embodiment consists of a plurality of transparent panel sections arranged in two tiers, those panel sections in the lower tier being identified with the numeral 12 and those in the upper tier with the numeral 14. Both panel sections 12 and 14 are spherically curved with the same radius of curvature, and are adapted to interfit together to form a larger partially spherical surface (here a hemisphere) of the same radius of curvature.

The non-contiguous or bottom edges of the lower tier of panel sections 12 are engaged by support means as shown in FIG. 1 by resting in a channel section 16 preferably of aluminum in turn resting on a foundation surface and secured thereto so that a sunlit enclosure is thus provided suitable for use as a greenhouse.

As seen in FIG. 3 each lower panel section 12 has formed along a portion of the periphery defined by the three sides which are contiguous with other panel sections, a U-shaped channel edge section, while upper panel sections 14 have formed about the lower three sides a similar interfitting channeled edge section. As seen in FIG. 4 these adjacent channel sections are adapted to nest one within the other and to be secured together by means of appropriate fasteners 32 such as bolts or rivets. These nesting channel edges provide the function of locating the panels with respect to each other to make assembly thereof much easier. Furthermore, the relative geometry is such that the lower channel as viewed in FIG. 4 has a smaller inside radius than the outside radius of the upper channel edge member so that upon drawing together the panels by the fastener 32 the lower panel section is spread to provide a good sealing contact therebetween such as to eliminate in most situations the need for sealants or gaskets at the joint.

As seen in FIGS. 2 and 3, the lateral edges of the panel sections 12 and 14 extend generally converging in a vertical direction such that the nesting channel edges perform the function of stiffening ribs, such that the need for a separate frame or for a relatively heavy wall thickness of the panel sections 12 is eliminated.

Also it can be seen that the lower tier consisting of panel sections 12 forms a segment A of the hemisphere with each panel section 12 comprising one eighth of the segment, and the upper tier consisting of panel section 14 forms a segment B of the hemisphere with each panel sections 14 forming a fourth of the segment. As seen in FIG. 2, the vertically extending edges of the upper and lower tier panel sections 12 and 14 are positioned to be aligned at diametrically opposite locations, such that one half sections of the hemisphere on either side of the plane "X" in FIG. 2 may be utilized in half dome applications allowing standardized panel sections.

The number of panel sections is preferably selected such that for a given size dome structure, the individual panel sections will fit in station wagon door openings as to be easily transported by the do-it-yourselfer.

The lower molded panel sections 12 as well as the upper panel sections 14 would preferably be formed of a transparent or translucent acrylic plastic so as to maximize transmissibility of light in the ultraviolet range. The appropriate forming into the spherical shape could be carried out on an appropriate mold surface with vacuum forming techniques used in conjunction with an oven capable of heating the plastic to a temperature high enough to allow the permanent shaping thereof into the contout described.

One of the panel sections 12 has a corresponding opening thereinto so as to receive a spherically shaped door 18 fit into an aluminum channel 20 formed about the opening. The door 18 is preferably made in two sections, i.e. in the form of a "dutch door" so that the upper door may be opening to allow ventilation circulation of air thereinto while preventing the entrance of pets, vermin, etc.

A center pole 22 may also be provided to stiffen the structure as well as to provide support for a movable ventilator center cap 24 disposed above the opening 25 formed at the top of the dome which ventilator cap may be raised to allow ventilation in a manner to be described herein in further detail. Alternatively an electrically powered vent apparatus (not shown) may be provided, in which case the center brace pole 22 will provide a conduit passage for the associated electrical wiring.

Potting benches 26 of a curvilinear shape such as to allow concentric positioning of the outer edge thereof in close proximity to the wall structure defined by the panel sections 12.

As seen in FIG. 5, the door 18 would be adapted to be received in an aluminum section 18 which in turn receives the edge of the particular panel section which has been cut out to form the door opening so that the hinges 36 may be secured thereto. The door section 18 would then be formed from the piece of panel section 12 cut out from the panel section 12.

As seen in FIG. 6 the floor channel 16 could be provided with an edge 38 which could be fastened to the foundation footing 40. Adhesive sealant could be applied to both retain and seal the lower edges in the floor channel 16.

The center cap 24 is mounted on a slidable post 42 received within the center pole 22 as shown in FIG. 6 with a pin 44 affixed to post 42 protruding through a slot formed in a center post 22 is provided to provide a means for elevating the post with a locking slot arrangement (not shown) to keep the center cap 24 in the raised position. A plurality of struts 46 affixed at one end to the center post 22 and at the other end to appropriate pads formed on the upper surface of the upper panel sections 14 will also be provided to brace the center post 22 and the panel section edges. A footing 48 would in this case be provided to position the center post to provide support thereof. As described above, a power vent unit could alternatively be installed of a type generally available which typically includes an electric motor and blower with an aluminum housing and weather cap having a screened opening, in which case the center post 22 could be utilized as a conduit passage for the necessary electrical wiring.

Supplemental heating units, humidifiers, watering arrangements, etc. typically also can be included but are not shown here since they may be of conventional construction.

It can be seen that this construction has great advantage in that the panel sections are relatively simple in contour not requiring any reinforcing corrugations thereof other than the joint itself which joints also serve to locate the panels with respect to each other during assembly. Once the structure is assembled, it is structurally very rigid due to the nature of the hemispherical construction and the edge configuration such that a framing structure is not required and relatively thick panel thicknesses may be utilized. Thus the cost of the structure itself and the installation labor is greatly reduced over conventional greenhouse designs. It can also be seen that the absence of any aluminum framing renders the heat loss characteristics of the structure much superior to aluminum framed greenhouses, and the potential leaks are greatly reduced as the glass to metal gasket requirements are eliminated. Further the resulting structure should be completely maintenance free and provides an extremely attractive appearance due to its domed shape. The absence of framing members likewise maximizes the amount of light available within the enclosure which is an important consideration for the culture of most plants.

As mentioned above, this construction is also applicable to half-dome structures which may be installed appurtenant to existing vertical wall structures such as would be provided by the exterior wall of a residence. In this case one half of the hemisphere described would be utilized, with the lower panel sections 12 and the upper panel sections 14 non-contiguous edges extending into an aluminum channel 50 affixed to the residents wall and the lower edges of the lower panel sections 12 resting in aluminum channel section 52 affixed to a slab structure 54 such as is commonly utilized as a patio surface. This form of the invention could advantageously be utilized as a sunlit enclosure adapted to be used as "solarium" during the cold winter months with incidental usage as a temporary greenhouse and as such the provision of an access door could be dispensed with since the structure would be dismantled during the warm weather months.

Referring to FIG. 3 an extended model could be provided by the provision of additional curvilinear panels 56 and 58 which would form a semi-cylindrical structure which would be secured to half-hemispherical sections 60 and 62 which could be constructed as the hemispherical version depicted in FIGS. 1-3.

Figure 9:
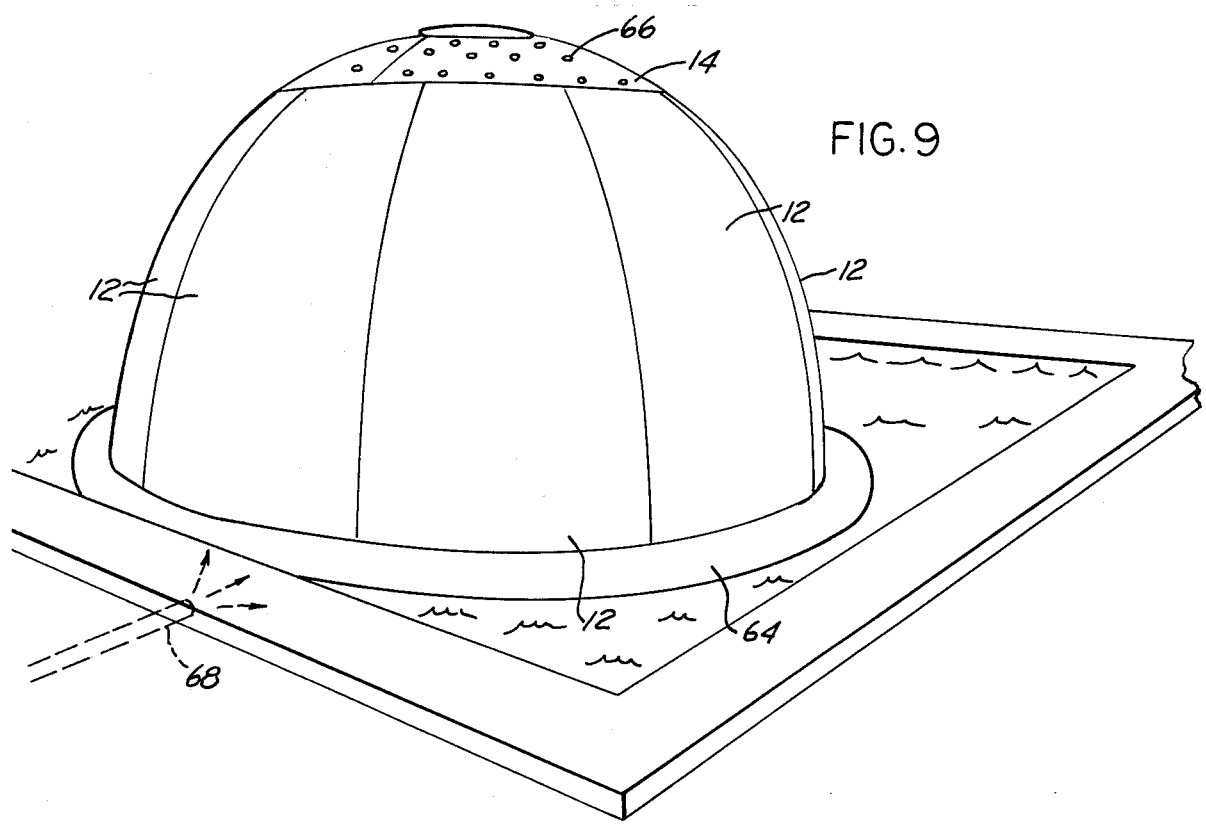
FIG. 9 shows a perspective view of the frameless structure according to the present invention in which a swimming pool shelter is provided.

Finally the same construction could be utilized in providing a swimming pool shelter as depicted in FIG. 9. In this instance the lower edges of the panel sections 12 would be affixed to a flotation ring 64 which could be fabricated from a foamed plastic material and having sufficient buoyancy to support the weight of the complete structure. The upper tier of panel sections would be perforated at 66 to allow escape of heated air to prevent an excessive temperature rise beneath the structure. In the event the swimming pool was heated, the structure could advantageously be located adjacent to the warm water inlet at 68 so as to maximize the advantage of the same. Thus a very simply installed pool shelter is provided eliminating the need for a permanent frame, since the structure may simply be assembled and then be lifted into the pool.

Figure 10:
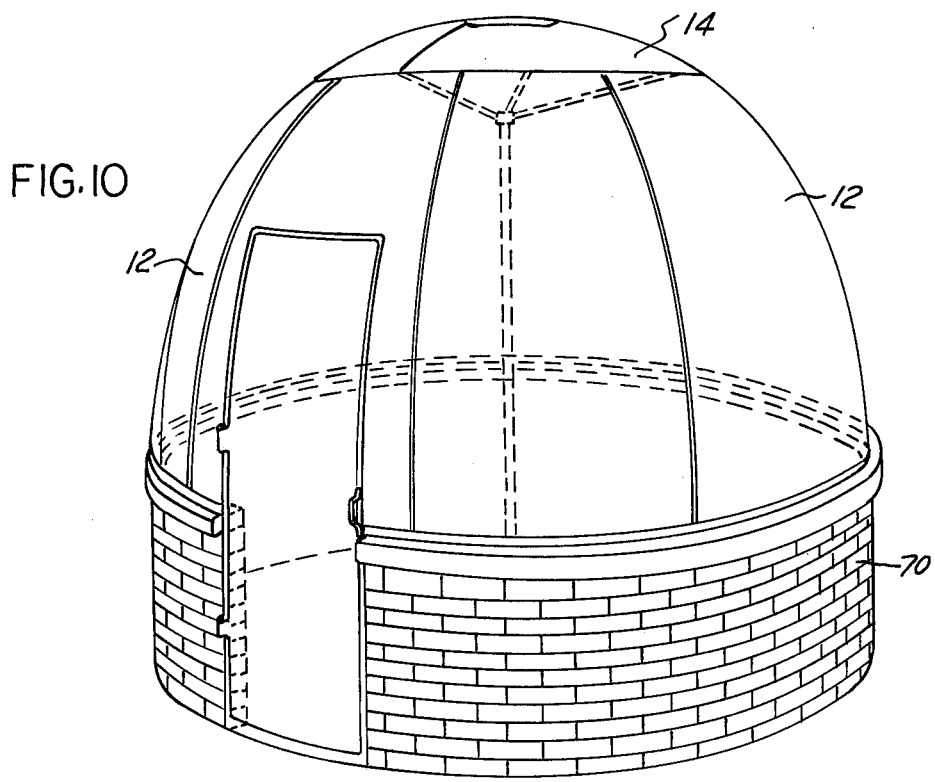
FIG. 10 is a perspective view of an installation of a dome enclosure according to the present invention on a raised permanent wall structure.

As shown in FIG. 10, the dome could also be mounted on a raised foundation wall 70 to provide additional enclosed space, as is presently the practice with conventional greenhouse structures.

As discussed above, it can be appreciated that the construction as described has a great number of advantages from a functional standpoint and aesthetic as well and even though the structure has particular advantage in the context of a sunlit enclosure such as for a solarium greenhouse, swimming pool shelter, the constructural details as disclosed also could provide a quickly and easily erected shelter for non-sunlit applications such as for storage sheds, etc.

The embodiments of the invention in which an exclusive property or privilege is claimed are defined as follows:

1. A frameless hemispherical structure of rigid translucent plastic material comprising:
    a lower tier consisting of a first plurality of adjacent congruent truncated segments of a sphere, each segment having substantially U-shaped integral concave lateral edge channels which overlap and nest within the opposite edge channel of the adjacent panel to form a first series of depressions which extend throughout the vertical length of the lower tier and are uniformly spaced therearound;
    an upper tier consisting of a second plurality of congruent hemispheroidal segments having substantially U-shaped integral concave lateral edge channels which overlap and nest within the edge channels of adjacent panels to form a second series of depressions which extend the vertical length of the upper tier and are uniformly spaced therearound;
    all of said panels in said first and second pluralities having a common uniform compound radius of curvature;
    the upper edge of the lower tier panels and the lower edge of the upper tier panels also having substantially U-shaped integral concave channels which overlap and nest within one another to form a continuous horizontal depression which encircles the structure and is contiguous to both the first and second series of spaced depressions;
    the number of panels in the lower tier being greater than the number of panels in the upper tier;
    and fastener means sealingly disposed through the panels in the depressions to secure the structure together.

2. A frameless hemispherical structure as defined in claim 1 wherein the number of panels in the upper and lower tiers is selected such that the first series of spaced depressions ae coextensive and coplanar with the second series of spaced depressions only along a single circumferential great circle, the remaining first and second series of depressions being non-coextensive and non-aligned,
    whereby the structure may be disassembled into a pair of half-dome structures along said great circle.

3. A frameless structure as defined in claim 1 wherein a door opening is formed in one of the panels of the lower tier;
    said structure further comprising a rigid metal door frame channel disposed within and sandwiching the door edge opening of said lower panel.

4. A structure as defined in claim 3 further including a door disposed in said opening and comprising independently hinged upper and lower panel portions.

5. A structure as defined in claim 1 further including a rigid metal base channel extending substantially continuously around the bottom edge of the structure and having a continuous circular depression for receiving the bottom edge of the panels of the lower tier.

6. A structure as defined in claim 1 further including means associated with said upper tier panels for ventilating the structure.

7. A structure as defined in claim 1 further including a circular body of buoyant material having a diameter substantially equal to that of the hemispherical structure and secured to the bottom edge of the structure and of sufficient buoyancy and volume to float the structure on a body of water.

8. A structure as defined in claim 1 further including a rigid central vertical support member vertically disposed within said structure in supporting relation with at least a portion thereof.

9. A frameless structure as set forth in claim 1 and further comprising at least a pair of non-spheroidal extender panels having only a single radius of curvature and adapted to be interposed between the opposite halves of the hemispherical structure for the purpose of elongating said structure.

10. A structure as defined in claim 1 wherein the edge channels exhibit a partially flat section to accommodate said fasteners.

11. A frameless structure of rigid translucent material comprising:

a lower tier consisting of a odd number of adjacent congruent truncated segments of a sphere, each segment having substantially U-shaped integral concave lateral edge channels which overlap and nest within channels of adjacently positioned panels to form a first series of spaced depressions which run the vertical length of the lower tier;

an upper tier consisting of an even number of congruent hemispheroidal segments having substantially U-shaped integral concave lateral edge channels which overlap and nest within one another to form a second series of spaced depressions which run the vertical length of the upper tier;

all of the panels having a uniform constant compound radius of curvature whereby in the assembled condition the panels from a one quater sphere dome of uniform compound radius of curvature having a semi-circular base and a semi-circular vertical edge;

the upper edge of the lower tier panels and the lower edge of the upper tier panels having substantially U-shaped integral concave channels which overlap and nest within one another to form a continuous depression which lies in a horizontal plane and which encircles the one quarter sphere dome and is contiguous to both the first and second series of spaced depressions;

and fasteners means sealingly disposed through the panels in the depressions to secure the structure together, said structure further comprising a semi-circular metal base channel encircling and supporting the lower horizontal edge of the structure and a second semi-circular edge channel encircling the vertical edge of the structure.

* * * * *